(12) United States Patent
Pacheco et al.

(10) Patent No.: US 8,009,031 B2
(45) Date of Patent: Aug. 30, 2011

(54) MOTORCYCLE SAFETY BRAKE AND RUNNING LIGHT FOR A JACKET OR VEST

(76) Inventors: Victor Manuel Pacheco, East Haven, CT (US); Chong Hui Kim, Seaford, VA (US)

( * ) Notice: Subject to any disclaimer, the term of this patent is extended or adjusted under 35 U.S.C. 154(b) by 548 days.

(21) Appl. No.: 12/290,182

(22) Filed: Oct. 28, 2008

(65) Prior Publication Data
US 2009/0134992 A1 May 28, 2009

Related U.S. Application Data (60) Provisional application No. 60/994,126, filed on Nov. 24, 2007.

(51) Int. Cl.
| B60Q 5/00 | (2006.01) |
| B60Q 1/26 | (2006.01) |
| B60Q 1/54 | (2006.01) |
| B62J 6/00 | (2006.01) |
| G08B 5/36 | (2006.01) |
| G08G 1/095 | (2006.01) |

(52) U.S. Cl. ........ 340/479; 340/463; 340/464; 340/465; 340/473; 340/475; 340/815.73; 340/908; 340/332; 340/432

(58) Field of Classification Search .................. None
See application file for complete search history.

(56) References Cited

U.S. PATENT DOCUMENTS

| 3,622,980 | A | * | 11/1971 | Elledge, Jr. ................. 315/323 |
| 5,070,436 | A | | 12/1991 | Alexander et al. |
| 5,249,106 | A | * | 9/1993 | Barnes et al. ................. 362/108 |
| 5,278,734 | A | | 1/1994 | Ferber |
| 6,439,733 | B1 | | 8/2002 | Fischer et al. |
| 6,538,567 | B2 | * | 3/2003 | Stewart ......................... 340/475 |
| 6,558,016 | B1 | * | 5/2003 | Restauro ....................... 362/103 |
| 6,679,615 | B2 | * | 1/2004 | Spearing ....................... 362/103 |
| 6,784,795 | B1 | * | 8/2004 | Pories et al. .................. 340/479 |
| 6,834,395 | B2 | * | 12/2004 | Fuentes .............................. 2/69 |
| 6,925,654 | B2 | | 8/2005 | De Silva |
| 7,109,857 | B2 | | 9/2006 | Ross, Jr. et al. |
| 7,623,026 | B2 | * | 11/2009 | Martin et al. ................. 340/473 |
| 2006/0012471 | A1 | * | 1/2006 | Ross et al. .................... 340/479 |
| 2007/0063831 | A1 | * | 3/2007 | Perkins et al. ................ 340/479 |
| 2008/0290999 | A1 | * | 11/2008 | Chen ............................. 340/432 |
| 2010/0117852 | A1 | * | 5/2010 | Matte ....................... 340/815.74 |

FOREIGN PATENT DOCUMENTS

| BE | 812991 | 7/1974 |
| GB | 2341227 A | 3/2000 |
| GB | 2411226 A | 8/2005 |
| WO | WO 2005/020731 A1 | 3/2005 |

* cited by examiner

*Primary Examiner* — Julie Lieu (57) ABSTRACT

A traffic signaling device system for motorcyclists comprising a safety brake and running light assembly (34) mounted to a motorcycle jacket (88). The safety brake light has an L.E.D. housing (22) supported by an outboard support member (20) and a leather piece (18). A plurality of snap buttons (16) can be used to secure safety brake light to jacket. The safety brake light has a six-conductor coil cable assembly (12) extending outside of jacket in front thereof is connected to a control box panel (44) so that the rider can view the operation of control box panel in a convenient seated position. At one end of control box is a six-conductor cable (50) which is electrically connected thereof to the existing wiring for a tail and brake light (78), a left turn signal light (80), and a right turn signal light (81) in such vehicles. Other embodiments are described and shown.

20 Claims, 6 Drawing Sheets

MOTORCYCLE SAFETY BRAKE AND RUNNING LIGHT FOR A JACKET OR VEST

CROSS-REFERENCE TO RELATED APPLICATIONS

This application claims the benefits of provisional patent application Ser. No. 60/994,126, filed 2007 Nov. 24 by the present inventors.

FEDERALLY SPONSORED RESEARCH

None.

SEQUENCE LISTING OR PROGRAM

None.

BACKGROUND OF THE INVENTION

1. Field of Invention

This invention generally relates to the motorcycle rider, specifically to the "jacket" which offers a place for mounting a brake and running light that is more conspicuous to automobile drivers.

2. Prior Art

Motorcycling can be quite a challenge especially in urban areas where being seen by other drivers has been the primary concern riders have in everyday traffic. Almost half of all motorcycle accidents are caused by automobile drivers not seeing the motorcyclist due to its small profile frame, and traffic signaling devices that are too low to the ground. Thereafter, inventors have created several types of traffic signaling devices, they are U.S. Pat. No. 7,109,857 to Ross, Jr. et al (2006) discloses a helmet with a wireless signaling device attached to the rear of the helmet that emits a warning signal when the rider actuates the brakes. However in order for this device to function, it requires a receiver module with its own power supply, if the batteries go dead while on the road, the unit will stop functioning. Therefore, this device is not dependable to work at all times while on the road. Furthermore, a brake light mounted on a helmet would not be an appropriate place for a signaling device because a cautious motorcyclist is constantly turning his or her head-searching for risk factors on the road. This action could send mixed signals or message to other drivers thus causing confusion as to the motorcyclist true intentions while braking or slowing down.

U.S. Pat. No. 6,925,654 to De Silva (2005) discloses a strap jacket for riders of non-enclosed vehicles with a signaling device comprising of six signal lamps and a horn assembly attached and powered by its own power supply. Additionally, two switch panel assemblies are incorporated with three pushbutton switches affixed to each side of strap members of jacket for activation of signal light assemblies. Thus, this type of signaling device suffers a number of disadvantages for motorcyclist:

(a) operation of switches while riding is very risky; requires rider to release controls each time to activate signaling device for turning, slowing down or stopping, etc.

(b) does not work in synchronization with the manufacturer's signaling device system of the motorcycle and could lead to confusion if the wrong pushbutton is depressed.

(c) it is primarily designed for vehicles such as a bicycle; however, the switch panel should be located at or near the handle bars or controls of the vehicle to minimize the risk of an accident due to loss of control.

U.S. Pat. No. 6,679,615 to Spearing (2004) shows a lighted signaling device system that is attached to a motorcycle jacket and elbow portion of the jacket by any method, including gluing, sewing, tying, ironing-on or using a hook & loop fastener and connected to the electrical indicating system of the vehicle. The lighted signaling system may also display advertisements, logos, signs or other symbols. Spearing states, "In a preferred embodiment, the signaling modules 2 are attached to the vehicle by a coaxial cable containing at least five wires joined by small, durable five-pronged male and female plugs. The wires 7 and plastic encasing 8 should be thick and durable enough to withstand season changes and rainy weather."

The major disadvantage to this signaling device is the fact that a thick coaxial wire has to be routed through the inside of the jacket and come out the back which means a hole to fit five wires must be made through a presumed name brand jacket thus limiting the use of the jacket to only the signaling device and not for casual wear, etc. Another disadvantage to a coaxial cable going through the jacket is that it could cause a discomfort to the user while riding thus distracting him or her from concentrating on the road.

U.S. Pat. No. 6,558,016 to Restauro (2003) discloses a garment without sleeves having a series of light emitting diodes (LEDs) arranged in a circular pattern on the center, left, and right back side thereof for providing better and more visible rear lighting for a motorcyclist. The LEDs are connected by a power cord that Restauro describes as being extended between an inner and outer layer of material and coming out through a hole near the bottom edge back side of the garment, and connecting to a power jack on the motorcycle tail and brake light fixture.

Although the power cord is conveniently extended between an inner and outer shell which should provide the user without the defect of feeling a cord on the back of the garment like in the prior art above, there are no means of signaling the user to remember to disconnect the power cord from the power jack to prevent damaging the cord when dismounting. This is a disadvantage of the prior art. Furthermore, if the motorcyclist wants to carry a passenger, it would not be practical for the user to extend the power cord to go around or underneath the passenger to connect to the power jack.

U.S. Pat. No. 6,538,567 to Stewart (2003), discloses a motorcycle jacket with built-in flat, arrow-shaped turn signal lights that are widely spaced apart at the upper, outer edges of the back side thereof connected by a three-conductor cable that goes between an inner and outer layer of the jacket and comes out the side seam. The cable or "tether" that comes out the side seam of jacket connects to a power jack on the motorcycle consisting of an electrical male connector and a transformer for adjusting the voltage for the LED lights, are spliced or electrically connected to the electrical wires of the left and right turn signal lights for the vehicle. A coil spring is installed through the three-conductor cable in the body of the vehicle for providing a tug effect on the tether of the jacket if the rider forgets to disconnect when dismounting the motorcycle.

As in the description of the prior arts above, Stewart's method also requires a custom made jacket or vest specifically for incorporating his signaling device directly onto the garment at the manufacturing plant. These permanent alterations to a garment are complicated and not cost effective to manufacture. Another disadvantage of the prior art in terms of being seen by other drivers on the road is the fact that Stewart provides more visibility for the rider during the activation of the turn signal switch on the handlebars, working in synchronism with the turn signal lights for the motorcycle. Therefore, the signaling device garment is limited to providing more visibility when changing lanes or turning, provided the rider uses the turn signals.

In conclusion, insofar as I am aware, no motorcycle safety signaling device formerly developed provides a traffic signaling device system that is sold separately and attaches to any jacket or vest, easily and conveniently. And, it requires no permanent alteration to the garment other than a piece of conventional hook and loop material sewn on to the outer layer of jacket by anyone skilled in the art of sewing.

SUMMARY

The invention, a motorcycle safety brake and running light for a jacket or vest, has an L.E.D. housing that is joined to the outer shell fabric of the garment by a plurality of support members of substantially equal length. The invention comprises a cable extending outside of the jacket to a control box without the discomfort of inner encircling cable going through garment. The control box has an electrical platform for the wiring comprising a connection jack, an L.E.D. indicator light, and a switch for normal and fog mode operation is mounted to the gas tank or near the motorcycle controls.

Accordingly several objects and advantages of the invention are to provide a device to accommodate use by a motorcycle rider or user of non-enclosed vehicles on a jacket or other similar garment that will be more conspicuous to other drivers on the road; to provide a device which only operates when the existing electrical system is energized; to provide a device which allows the rider to manipulate for normal to high intensity lighting in fog areas or hazardous weather conditions; to provide a device which will remind the rider to disconnect when the existing electrical system is deenergized; and to provide a more user-friendly, stylish, yet economical traffic signaling device that can be worn on any garment without permanent alteration to fabric. Still further objects and advantages will become apparent from a study of the following description and the accompanying drawings.

REFERENCE NUMERALS 12 six-conductor coil cable assembly
14A six-pronged male quick-disconnect plug
14B six-pronged male quick-disconnect plug
15 dust cover
16 snap button
18 leather piece
20 outboard support member
22 L.E.D. housing
24 inboard support member
26 screw
28 retainer
30 L.E.D. housing six-pronged female jack
31 groove
32 reflective tape
34 safety brake and running light assembly
36 light emitting diodes (LEDs)
38 left turn signal LEDs
40 right turn signal LEDs
42 L.E.D. light array assembly
43 collar
44 control box panel
45 neck
46 illuminated rocker switch assembly
47 flexible magnetic strip
48 L.E.D. indicator light
49 capacitor
50 six-conductor cable
51 foam pad
52 electrical circuit platform
53 drain hole
54 screw mount
55 wire lead
56 screw
57 wiring junction
58 six-pronged female jack
59 wire lead
60 fog mode switch
61 wire lead
62 indicator light
64 wire lead
65 diode
66 wire lead
68 wire lead
69 wire lead
70 wire lead
71 ground wire lead
72 wire lead
74 wire lead
76 wire lead
78 tail and brake light
80 left turn signal light
81 right turn signal light
82 front brake light switch
84 rear brake light switch
86 wiring junction
88 motorcycle jacket

DETAILED DESCRIPTION OF THE INVENTION—FIGS. 1-11

Figure 1:
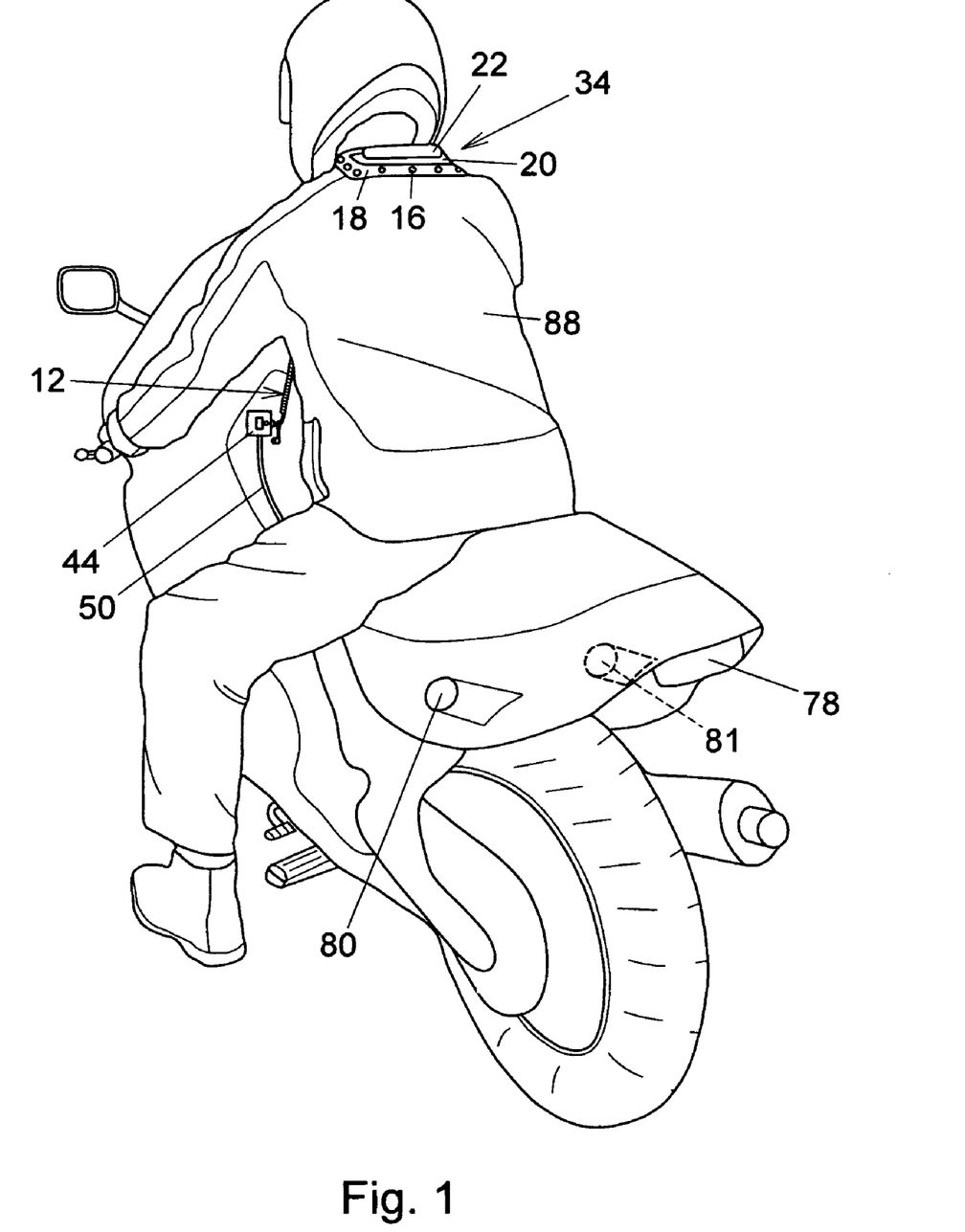
FIG. 1 is a front perspective view of a traffic signaling device constructed in accordance with the invention for use in conjunction with a jacket or vest and a motorcycle.

An overall view of a safety brake and running light assembly 34 constructed in accordance with the invention is illustrated in FIG. 1 (a front perspective view). An L.E.D. housing 22 of the traffic signaling device is mounted to an outboard support member 20, which is horizontally mounted to a leather piece 18 having a plurality of snap buttons 16, circumferentially fastened to leather piece 18. Safety brake light assembly 34 is mounted to a motorcycle jacket 88 using a conventional hook and loop material (not shown). One half of the hook and loop material is bonded to the back side of leather piece 18 and the other half sewed on to the back side of the upper portion of jacket 88. While the plurality of snap buttons is preferably for an aesthetic look, such buttons can be used for securing the safety brake light assembly to the jacket by installing a plurality of conventional rivet members (not shown) of the snap buttons to either a piece of fabric material or to the conventional hook and loop material half that is sewed on to jacket 88 (not shown).

The safety brake light assembly has a six-conductor coil cable assembly 12 extending across the outside of jacket in front thereof is connected to a control box panel 44 that is positioned near the motorcycle controls. At one end of the control box panel is a six-conductor cable 50 which is connected by using conventional tap-in squeeze connectors (not shown) to the existing wiring for a tail and brake light 78, a left turn signal light 80, and a right turn signal light 81 in such vehicles.

Figure 2:
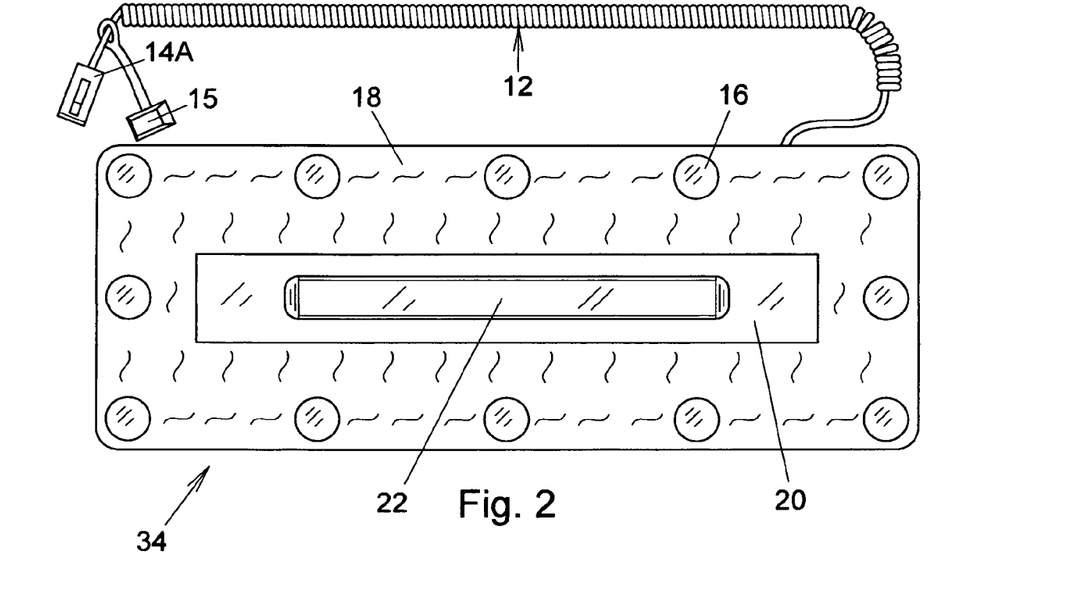
FIG. 2 is a front elevational view of the traffic signaling device of FIG. 1 disconnected.
Figure 3:
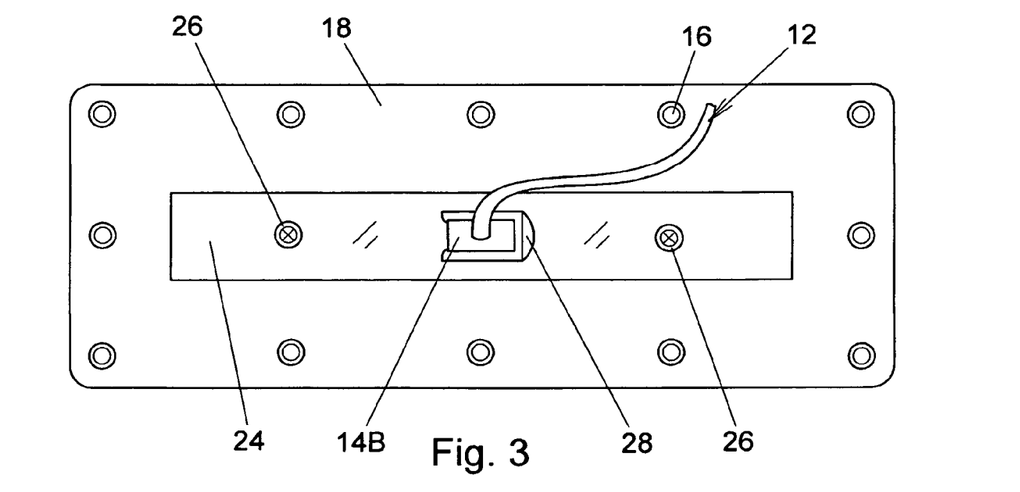
FIG. 3 is a rear elevational view of the traffic signaling device.

FIGS. 2 and 3 show front and rear elevational views of safety brake light assembly 34, showing six-conductor coil cable assembly 12 disconnected from control box panel 44 shown in FIG. 1. Coil cable assembly 12 comprises a six-pronged male quick-disconnect plug 14A, a six-pronged male quick-disconnect plug 14B, a dust cover 15 made from rubber, and a plurality of conventional insulated electrical wire leads (not shown) encased in a flexible helical insulation. The plurality of quick-disconnect plugs which are made from hard plastic material and having a conventional quick release or connection mechanism (not shown) has a plurality of conventional terminals or contacts that are permanently connected to the wire leads of coil cable assembly 12 (not shown).

While I prefer the coil cable assembly for this embodiment of FIG. 1 have an extended length of at least 1.52 meters long, and be made for six prongs or contacts, such cable may be of different lengths and contacts, and of a retractable type, etc. I contemplate that the wiring throughout this embodiment be made of 22 gauge, but other sizes are also suitable.

In the preferred embodiment, the leather piece is a soft leather trim piece black, such as deertan cowhide, available from Tandy Leather Factory of Fort Worth, Tex.

I presently contemplate that the leather piece of the embodiment of FIG. 1 have a rectangular cross section of approximately 23.5 cm long by 9 cm wide, and a thickness of about 2 mm. However, it can have different cross sections, such as oblong, oval, trapezoidal, triangular, circular, arch, elliptical, syncline (V-shaped), etc., and made of different sizes and materials, such as high-carbon steel, titanium, polycarbonate, stretchable elastic or non-stretchable material, for example, nylon or rayon, etc. The outer four corners are typically rounded to avoid snagging and personal injury. The plurality of snap buttons is fastened to leather piece 18 along the edge of the fabric. I also contemplate that the leather piece of this embodiment use metal snap buttons, but other buttons are also suitable.

Figure 4:
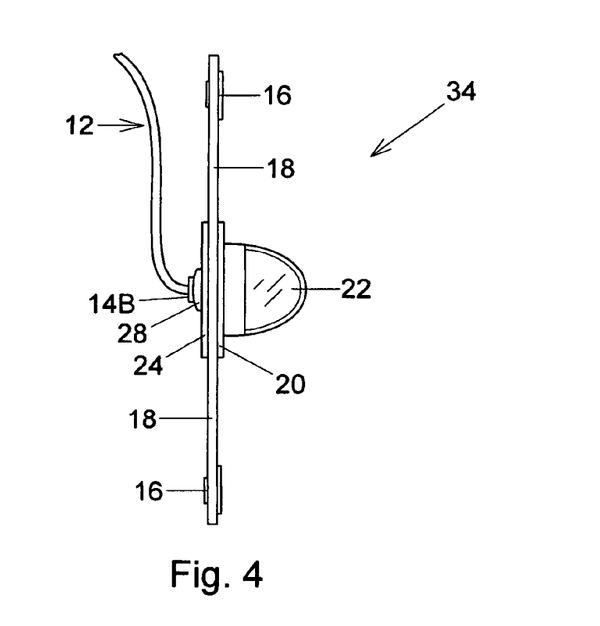
FIG. 4 is a left elevational view of the traffic signaling device.

Leather piece 18 is sandwiched by outboard support member 20, and an inboard support member 24 being best shown in FIG. 4. I presently contemplate that the plurality of support members have a cross section of about 17.5 cm long by 2.5 cm wide, and a thickness roughly 0.8 mm to 1.2 mm, and made from injection molding. However, the plurality of support members can be made of different sizes, and be made from any other material that can be repeatedly bent without fracturing, such as polypropylene, vinyl, nylon, rubber, metal, various impregnated or laminated fibrous materials, for example, fiberglass, and various plasticized materials, etc.

Figure 5:
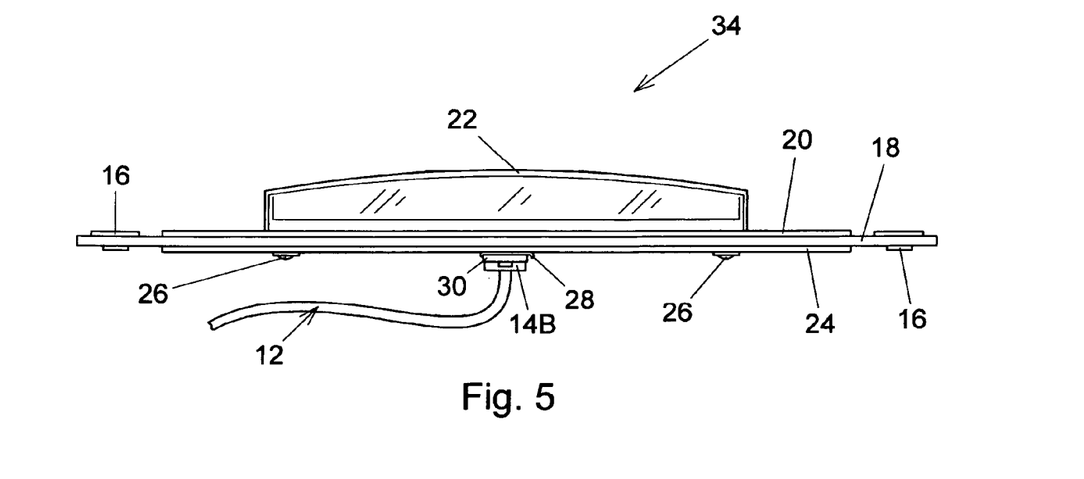
FIG. 5 is a plan view of the traffic signaling device.
Figure 7:
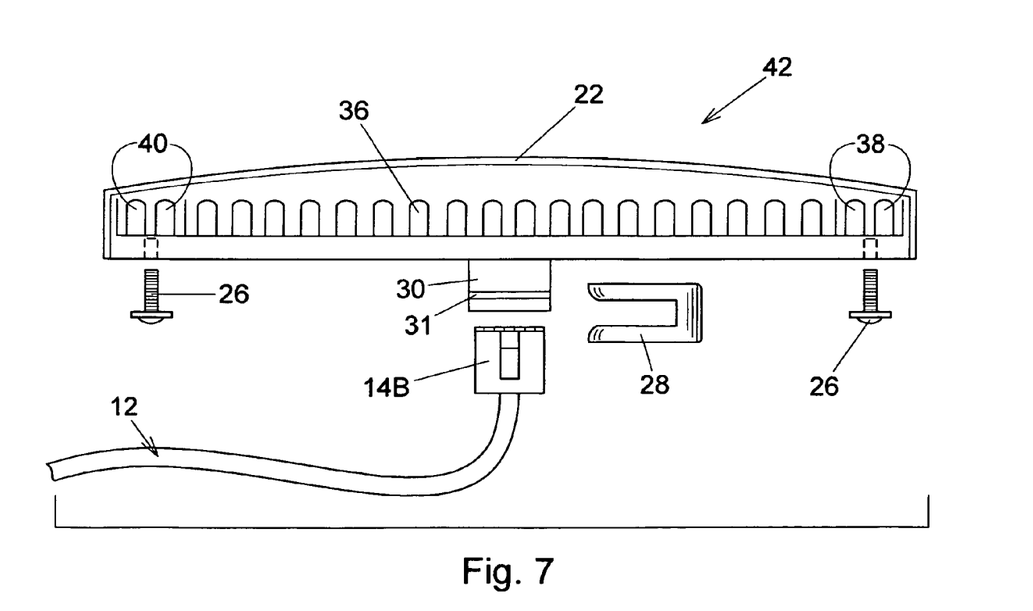
FIG. 7 is an exploded view in detail of the portion indicated by the section lines 7-7 in FIG. 5.

L.E.D. housing 22 is joined to leather piece 18 and the plurality of support members by a plurality of screws 26 being best shown in FIGS. 3, 5 and 7 that goes through a hole (not shown) made into all the materials and threaded into housing 22. The center of leather piece 18 and the plurality of support members is punched out (not shown) so that an L.E.D. housing six-pronged female jack 30 having a groove 31 being best shown in FIG. 7, fits properly through the members from the outboard side, being best shown in FIGS. 4 and 5. Jack 30 of L.E.D. housing 22 is then further secured to the members by a retainer 28 that is joined to groove 31 (FIG. 7). Retainer 28 may be made of durable flexible plastic material. Groove 31 is formed on both side of jack 30 running parallel to L.E.D. housing 22 and may be formed by machining, scoring, rolling, or extruding. The cavity of retainer 28 is the same outside diameter of the recess made into jack 30 forming groove 31. The jack is formed during the injection molding process of L.E.D. housing 22 and centered as shown in FIG. 7. A hole (not shown) approximately 3 mm in diameter is tapped into the bottom side of L.E.D. housing 22 near the outer corners for joining screws 26. Screws 26 are made of hard plastic material and of sufficient size and strength. Q.D. plug 14B of coil cable assembly 12 is connected to jack 30, easily and conveniently.

FIGS. 4 and 5 show plan and elevational (left) views of safety brake light assembly 34, showing L.E.D. housing 22 centered on leather piece 18 and outboard support member 20 joined by inboard support member 24, screws 26, and retainer 28. The side of the conventional hook and loop material that has the adhesive (not shown) is bonded over the entire back side of leather piece 18 and inboard support member 24. A cutout (not shown) is made into the hook and loop material, thereby exposing retainer 28, screws 26, and jack 30 having a plurality of conventional terminals or contact for each wire lead (not shown).

Figure 6:
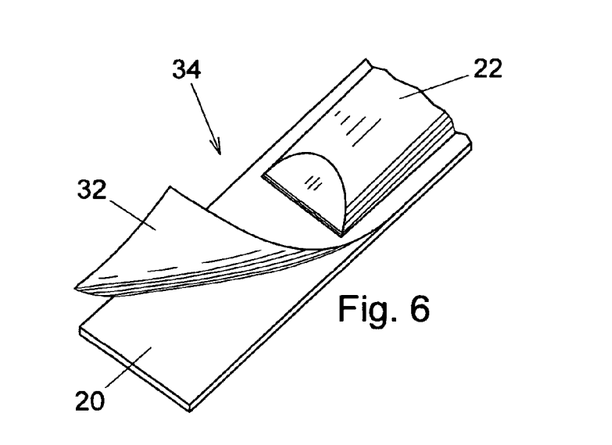
FIG. 6 is a front perspective view of the traffic signaling device with some parts shown.

FIGS. 6 and 7 show a front perspective view with some parts shown and an exploded view in detail of the portion indicated in FIG. 5 of safety brake light assembly 34, showing the inside parts of L.E.D. housing 22. A reflective tape 32 is bonded to outboard support member 20 (FIG. 6). Reflective tape 32 is applied to the entirety of one side of outboard support member 20 and made of high intensity reflective material.

An L.E.D. light array assembly 42 comprises a plurality of light emitting diodes (LEDs) 36, a plurality of left turn signal LEDs 38, and a plurality of right turn signal LEDs 40 extending to at least the full length of L.E.D. housing 22 (FIG. 7). L.E.D. housing 22 is made of transparent or translucent plastic, and tinted red for LEDs 36, and amber for LEDs 38 and 40 respectively.

I presently contemplate that the L.E.D. housing of the embodiment of FIG. 1 have an overall dimension of about 15 cm long and having a cross section roughly from 1.2 cm to 1.7 cm wide at the base, and roughly from 2 cm to 2.5 cm in height having an oval or square shape at the top of the housing. However, it can have different cross sections, such as oblong, oval, trapezoidal, triangular, circular, arch, elliptical, syncline (V-shaped), etc., and made of different sizes, and rigid or flexible materials, such as metal, polycarbonate, polypropylene, rubber, and various impregnated or laminated fibrous materials, etc.

In other embodiments, the plurality of support members adheres to the leather piece or a base (not shown) for joining the L.E.D. housing of the embodiment of FIG. 1 by virtue either of adhesive or heavy duty mounting tape onto each side of the base—or there may be no support members at all and the entire assembly can be made as one whole unit by the extrusion of liquid plastic or injection molding.

Figure 8:
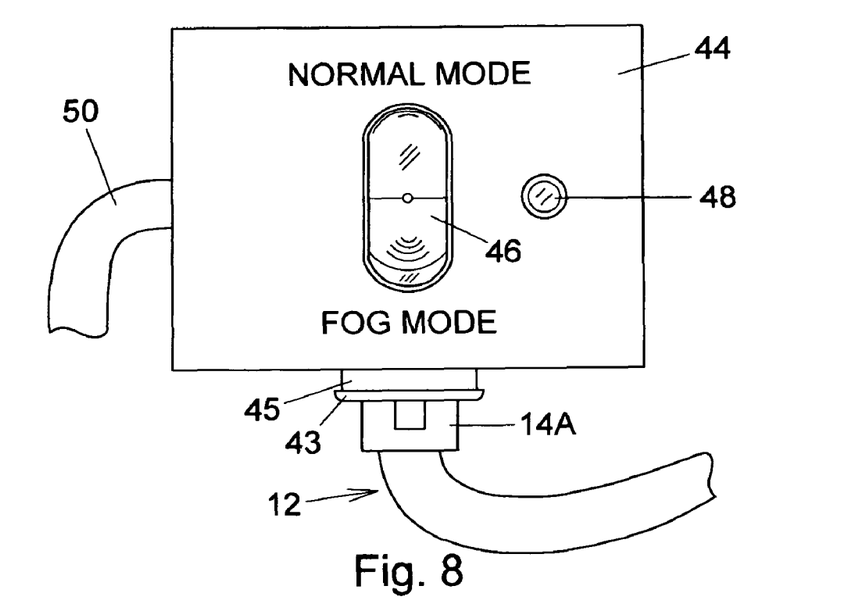
FIG. 8 is a plan view of a control device with a switch and indicator that form part of the traffic signaling device of FIG. 1.
Figure 9:
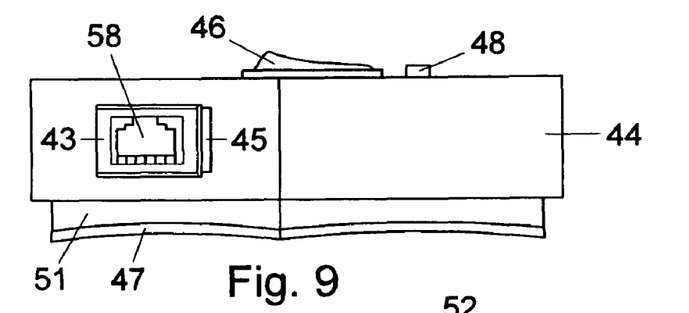
FIG. 9 is a front perspective view of the control device showing its connection jack and mount.
Figure 10:
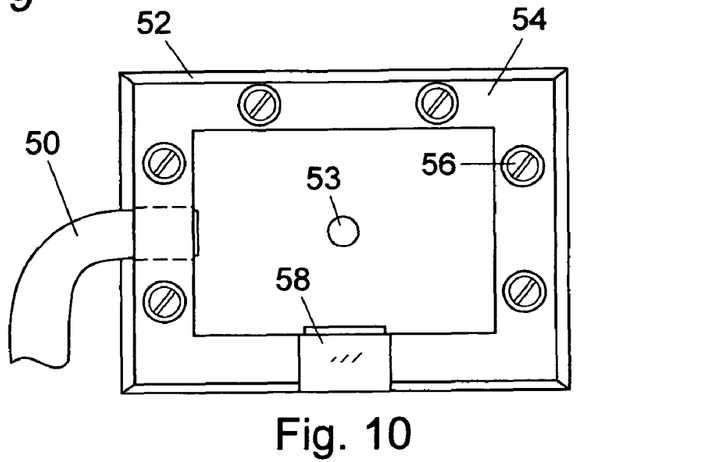
FIG. 10 is a plan view of the inside of the control device.

FIGS. 8, 9 and 10 show plan and perspective (front) views of control box panel 44, showing an illuminated rocker switch assembly 46 and adjacent to it on the surface the descriptive text "NORMAL MODE" and "FOG MODE", an L.E.D. indicator light 48 located to the right of the switch, coil cable assembly 12, and cable 50 connected to control box panel 44 (FIG. 8). A collar 43 and a neck 45 of control box panel 44 (FIGS. 8 and 9) are fixed to the body thereof during the extrusion of liquid plastic or injection molding which will form the body of the control box panel. The inside diameter of collar 43 and neck 45 should have a diameter of sufficient size to allow Q.D. plug 14A to pass through without binding.

The control box panel, which is electrically connected to the existing wiring for the signaling device system in such vehicles, is mounted near the motorcycle controls, preferably positioned slightly to the right and forward of a gas tank (not shown). Control box panel 44 comprises an electrical circuit platform 52 (FIG. 10), a foam pad 51, and a flexible magnetic strip 47 (FIG. 9). The control box panel is secured to electrical circuit platform 52 by virtue either of a plurality of conventional screws or fitted in place by snap (not shown). Foam pad 51 and flexible magnetic strip 47 are glued together and cut to at least the overall bottom dimensions of the electrical circuit platform. The upper portion of the foam pad is bonded to the outside bottom portion of electrical circuit platform 52 being best shown in FIG. 9.

Electrical circuit platform 52 comprises a drain hole 53, a screw mount 54, a plurality of screws 56, a six-pronged female jack 58, and cable 50 (FIG. 10). I presently contemplate that cable 50 go through a narrow passage made on the left side at the base of the platform. However, the narrow passage can be made on any side including the bottom. The cable is secured tightly by a conventional cable tie (not shown).

Q.D. plug 14A is connected to jack 58, easily and conveniently (FIGS. 8, 9, and 10). I contemplate that the jack of this embodiment is locked into a cavity on the front side of electrical circuit platform 52 of the control box panel. However, in other embodiments, a conventional modular jack having a plurality of terminals or contacts can be electrically connected to the existing wiring for the signaling device system in such vehicles, and be supported by a mounting bracket or panel separate from the control box panel (not shown).

Drain hole 53 is formed by placing, in the extrusion path of the circuit platform, a hollow pin approximately 5 mm in diameter for the outlet of air during the injection molding process and centered as shown in FIG. 10. Screw mount 54 has a height of about 1.2 cm from the base of the platform and is tapped for screws 56 circumferentially mounted as shown in FIG. 10. Screws 56 are made from metal material.

A seat (not shown) around the head of each screw 56 may be made in the injection molding for the insulated wire leads of cable 50 by forming a narrow, curved ridge extending upwardly about 3 mm high and outwardly terminating midway of screw mount 54 with a cavity of approximately 3 mm wide facing hole 53.

I contemplate that the control box panel of this embodiment be made of plastic and chrome plated, but other materials and colors are also suitable. I also contemplate that it be mounted to the motorcycle gas tank with flexible magnetic strip 47, but other mounting and fastening materials or devices are also suitable for securing the control box to the frame or handlebars, including union by welding—or incorporated to the existing wiring harness and controls in such vehicles at the factory.

I presently contemplate that the control box panel of the embodiment of FIG. 1 have a cross section of approximately 7 cm by 7 cm (square shape) and a height of about 2.5 cm. However, it can have different cross sections, such as oblong, oval, rectangular, trapezoidal, triangular, circular, dome, fairing, elliptical, spherical, etc., and made of different sizes and materials, such as high-carbon steel, titanium, aluminum, polycarbonate, transparent or translucent plastic, fiberglass, etc.

Figure 11:
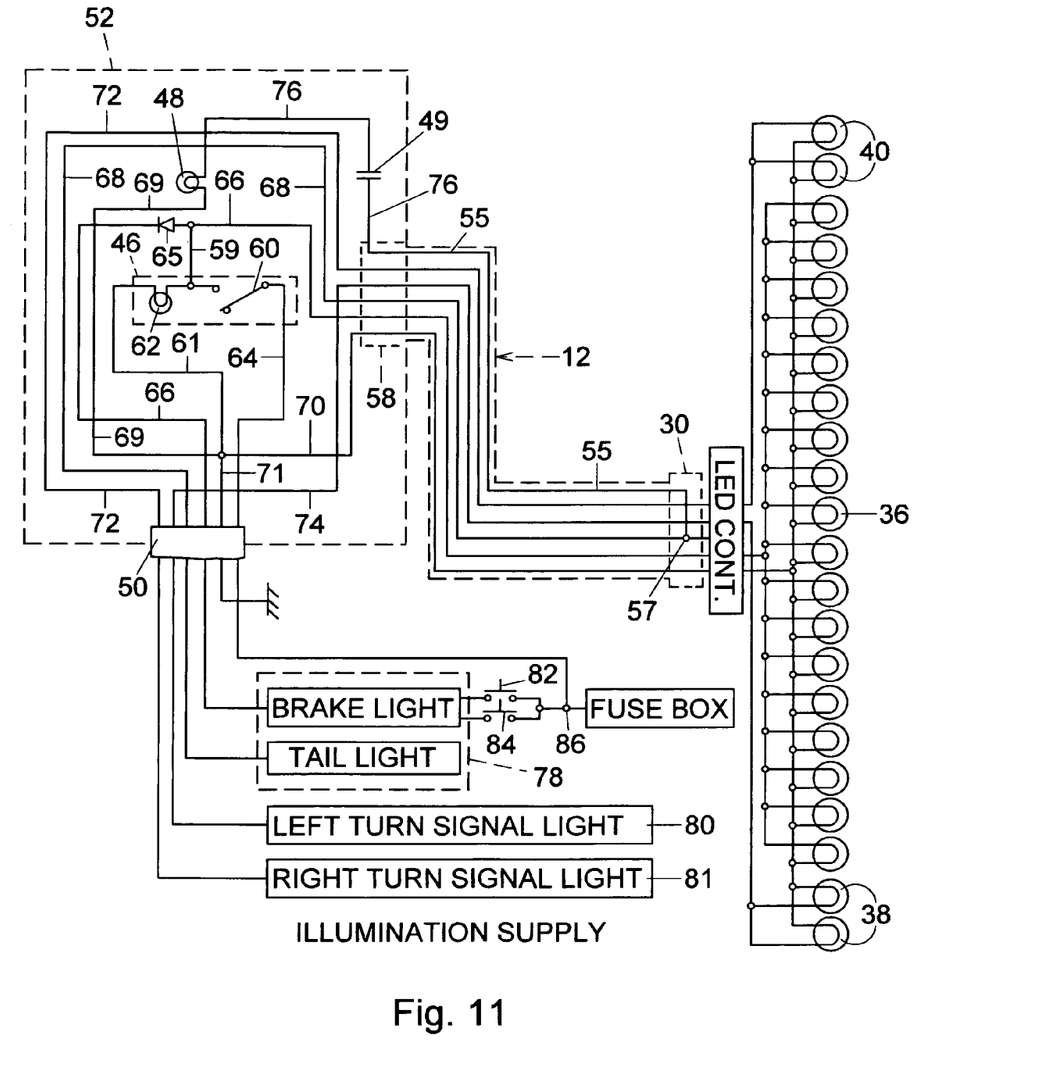
FIG. 11 is an electrical schematic of the present invention.

FIG. 11 shows an electrical circuit of the present embodiment of FIG. 1, illustrating how the wirings are connected in series with the existing wiring for the signaling device system in such vehicles, which are the source of electric energy (illumination supply) for the operation of safety brake light assembly 34. As mentioned, I contemplate that the wiring throughout this embodiment be made of 22 gauge, but other sizes are also suitable.

In this illustration, coil cable assembly 12, jack 30, jack 58, illuminated rocker switch assembly 46, and electrical circuit platform 52 are shown as dashed lines to show the interconnections between the components.

The electrical parts used for electrical circuit platform 52 comprises L.E.D. indicator light 48 which has a conventional built-in resistor (not shown), preferably for 12 volts DC electrical system rated for 30 A, a wire lead 59, a wire lead 70, a wire lead 76, a capacitor 49, preferably the uF electrolytic canister type rated at 24 volts DC, and be able to store a charge for a predetermined amount of time when the existing electrical system is deenergized, illuminated rocker switch assembly 46 comprising a fog mode switch 60 and an indicator light 62 which has a conventional built-in resistor and a fuse rated for 30 A at 12 volts DC (not shown), a diode 65, preferably a Zener diode for 12 volts DC electrical system rated for 21 mA, and jack 58 having a plurality of conventional terminals or contact for each wire lead (not shown).

At present I contemplate that L.E.D. indicator light 48 of this embodiment above be a non-flashing green indicator light, and indicator light 62, a non-flashing red indicator light, but other indicator lights are also suitable.

I presently contemplate that the control box panel of the embodiment of FIG. 1 have illuminated rocker switch assembly 46, but other switches are also suitable. I also contemplate that the control box panel have L.E.D. indicator light 48, and indicator light 62 (FIGS. 8, 9, and 11). However, it can have a plurality of indicator lights for other functions as well, for example, remotely viewing operation of the turn signals, etc.

Cable 50 which goes through the narrow passage at the base of the platform and leads to the existing wiring for the signaling device system in such vehicles, comprises a wire lead 64, a wire lead 66, a wire lead 68, a ground wire lead 71, a wire lead 72, and a wire lead 74, which are connected to screws 56 (FIG. 10) in the following manner.

Wire lead 64 is connected to the power terminal of fog mode switch 60 which is normally open (FIG. 11). This fog mode switch 60 is preferably a single-throw single-pole switch. The other end of wire 64 is connected at a wiring junction 86 located between a fuse box, a front brake light switch 82, and a rear brake light switch 84 in such vehicles.

At present I contemplate that wire 64 of cable 50 be connected to wiring junction 86 of this embodiment above, but other hot wires are also suitable, such as the existing wiring for the tail light of tail and brake light 78 in such vehicles (FIG. 11).

Wire lead 66 is connected to screw 56 corresponding to the terminal of jack 58 for the brake light wire lead of coil cable assembly 12 to LEDs 36. The other end of wire 66 is connected to the existing wiring for the brake light of tail and brake light 78 in such vehicles.

Wire lead 68 is connected to screw 56 corresponding to the terminal of jack 58 for the running light wire lead of coil cable assembly 12 to LEDs 36. The other end of wire 68 is connected to the existing wiring for the tail light of tail and brake light 78 in such vehicles.

Ground wire lead 71 and wire lead 70 are connected to screw 56 corresponding to the terminal of jack 58 for the ground wire of coil cable assembly 12 and jack 30. The other end of ground wire 71 is connected to the chassis ground (frame) wiring in such vehicles.

Wire lead 74 is connected to screw 56 corresponding to the terminal of jack 58 for the left turn signal wire lead of coil cable assembly 12 to left turn signal LEDs 38. The other end of wire 74 is connected to the existing wiring for left turn signal light 80 in such vehicles.

Wire lead 72 is connected to screw 56 corresponding to the terminal of jack 58 for right turn signal wire lead of coil cable assembly 12 to right turn signal LEDs 40. The other end of wire 72 is connected to the existing wiring for right turn signal light 81 in such vehicles.

As shown in FIG. 11, diode 65 is connected in series with cathode bar, non-pointing end, to wire 66 of cable 50. Wire 59 is connected to wire 66 on the opposite side of non-pointing end of diode 65, and to the power terminal of indicator light 62 which is energized intermittently. A wire lead 61 and a wire lead 69 from indicator light 62 and L.E.D. indicator light 48 are connected to screw 56 corresponding to the terminal of ground wire 71. Capacitor 49 is connected in series with wire lead 76 which is connected to the power terminal of L.E.D. indicator light 48, and jack 58, respectively, corresponding to the terminal of a wire lead 55 of coil cable assembly 12. A wiring junction 57 is specifically made for wire 55 at jack 30 corresponding to the running light wire lead of coil cable assembly 12 for LEDs 36, and wire 68 of cable 50 which is connected to the existing wiring for the tail light of tail and brake light 78 in such vehicles.

Note: the wire lead that is connected to wiring junction 57 in FIG. 11 is terminated at the terminal or contact (not shown) of jack 30. Thereby, making contact with wire 55 when coil cable assembly 12 is connected to jack 30.

L.E.D. light array assembly 42 (FIG. 7) comprising of the plurality of LEDs: LEDs 36, left turn signal LEDs 38, and right turn signal LEDs 40 are electrically connected in parallel (FIG. 11). The L.E.D. light array assembly consist of 18 each LEDs 36, 2 each LEDs 38, 2 each LEDs 40, and an LED control which has conventional built-in resistors and voltage regulators for providing at least 305 ma (high intensity) and 20 ma (low intensity) current to the plurality of LEDs (not shown).

The wire leads of L.E.D. light array assembly 42 are connected to the appropriate terminal of jack 30 (not shown). Coil cable assembly 12 is, therefore, connected to jack 30, and jack 58 using Q.D. plug 14A and Q.D. plug 14B being best shown in FIGS. 7 and 8.

I presently contemplate that the L.E.D. light array assembly of this embodiment have only 22 each LEDs for high and low intensity lighting. However, it can have a plurality of LED lights of more or less amount and be made of different sizes and materials for high and low intensity lighting, etc.

I also contemplate that the electrical circuit platform of the embodiment of FIG. 1 use the electrical parts listed above, but other materials are also suitable, such as an integrated circuit with built-in LEDs, switches, etc.

OPERATION of INVENTION—FIGS. 1,2,3,5,6,7,8, 9,10,11

In operation, when the existing electrical system to the motorcycle is energized and Q.D. plug 14A of coil cable assembly 12 is easily and conveniently connected to jack 58 of control box panel 44, the safety brake light assembly that is attached to jacket 88 is illuminated and operating in normal mode (FIGS. 1, 8 and 9). FIG. 1 show safety brake light assembly 34 mounted to the back side of the upper portion of jacket 88 so that it is more at eye level to other drivers on the road, thus making it more conspicuous. The presence of coil cable assembly 12 extending outside of jacket in front thereof as shown in FIG. 1, provides a continuously power supply of electric energy from control box panel 44 to safety brake light assembly 34. Consequently, LEDs 36 are operating at low intensity voltage. Thus, providing running lights through L.E.D. housing 22 for the motorcyclist in such vehicles (FIGS. 1 and 11).

The presence of the plurality of quick-disconnect plugs of coil cable assembly 12 serves for interlocking the cable to jack 30, and jack 58, respectively (FIGS. 7, 8 and 9), and so that current can flow to all the electrical components of electrical circuit platform 52, and safety brake light assembly 34, easily and conveniently (FIG. 11).

The presence of control box panel 44 (FIGS. 8 and 9) allows the rider to manipulate for normal to fog mode or high intensity lighting, and for remotely viewing operation of the traffic signaling device system. The presence of collar 43 and neck 45 of control box panel 44 in FIGS. 8 and 9 acts as a channel so that water will not run inside of jack 58 during a fall of rain, as well as a mount for a conventional dust cover (not shown). In FIG. 10, electrical circuit platform 52 is shown without the control box panel showing drain hole 53, screw mount 54, screw 56, and jack 58. The presence of drain hole 53 allows for water to drain that may enter during a fall of rain or a wash of such vehicles. The presence of screw mount 54, and plurality of screws 56 serves for interlocking the wire leads of cable 50 to the electrical parts used for electrical circuit platform 52 (FIGS. 10 and 11).

The presence of flexible magnetic strip 47 and foam pad 51 (FIG. 9) serves as a flexible mount and vibration dampener for the control box assembly. Therefore, when the mount is placed onto the gas tank, it conforms to the surface, easily and conveniently.

As shown in FIGS. 3, 4 and 5, L.E.D. housing 22 is secured to leather piece 18 by outboard support member 20, inboard support member 24, screws 26, and retainer 28. The presence of groove 31 (FIG. 7) is for interlocking retainer 28 to jack 30 of the L.E.D. housing, thus the assembly is firmly secured to leather piece 18. The presence of leather piece 18 having plurality of snap buttons 16 (FIGS. 1, 2, and 3) or conventional hook and loop material on the back side (not shown), either of which acts as a fastener, facilitates this process of securing safety brake light assembly 34 to jacket 88. Therefore, the safety brake light assembly attaches to the back side of the jacket so as to be able to remove the safety brake light assembly thereof, easily and conveniently.

FIG. 6 show outboard support member 20 having reflective tape 32 applied to the entirety of one side so that the rider is more visible to other drivers on the road if the safety brake light assembly stops functioning.

In normal mode, the presence of wire 59 allows for current to flow to indicator light 62 intermittently when the brakes are actuated (FIG. 11). Thereby, illuminating illuminated rocker switch assembly 46 each time the brakes are applied. Consequently, LEDs 36 are operating at high intensity voltage.

Thus, providing brake lights through L.E.D. housing 22 for the motorcyclist, while either front brake light switch 82 or rear brake light switch 84 is closed in such vehicles (FIG. 11).

If the rider desires to increase rear visibility in fog areas or during hazardous weather conditions, then the normally open fog mode switch 60 is closed by depressing illuminated rocker switch assembly 46 on control box panel 44 to fog mode, thereby, overriding front brake light switch 82, and rear brake light switch 84 (FIGS. 8 and 11). Consequently, when fog mode switch 60 is closed, indicator light 62 of illuminated rocker switch assembly 46 is continuously illuminated, and LEDs 36 have a constant supply of high intensity voltage thereto. Thus, providing rear fog lights through L.E.D. housing 22 for the motorcyclist in such vehicles (FIGS. 1 and 11).

The presence of diode 65 in FIG. 11 allows current to flow through it in one direction, and prevents current to flow back to the vehicle's brake light when fog mode switch 60 is closed. Consequently, allowing the brake light of tail and brake light 78 in such vehicles to operate normally.

FIG. 11 show wire 72 and wire 74 of cable 50 connected to the existing wiring of right turn signal light 81, and left turn signal light 80, respectively. When the vehicle's right turn signal light is actuated, current will flow to right turn signal LEDs 40 through wire 72. When the vehicle's left turn signal light is actuated, current will flow to left turn signal LEDs 38 through wire 74, thus providing turn signal lights through L.E.D. housing 22 in FIG. 7 for the motorcyclist.

The presence of capacitor 49 (FIG. 11) allows for the supply of current to L.E.D. indicator light 48 for a predetermined amount of time when the existing electrical system is deenergized. Consequently, drawing the rider's attention to control box panel 44 to disconnect Q.D. plug 14A of coil cable assembly 12 after such vehicle's ignition switch is turned off. If the rider forgets to disconnect when dismounting, then the presence of coil cable assembly 12 encased in the flexible helical insulation (FIGS. 1 and 2) allows the cable to flex in any direction thus providing a tug effect on the jacket that the rider will feel, thereby preventing damage to the coil cable assembly and/or the traffic signaling device system.

When the vehicle's ignition switch is turned on, and coil cable assembly 12 is connected to jack 58, the presence of wire 55 and wiring junction 57 in FIG. 11 allows for current to flow to L.E.D. indicator light 48 through wire 76 and capacitor 49. Thereby, indicating to the rider that LEDs 36 are energized.

The presence of ground wire 71 of cable 50 provides a common return path for electric current for the electrical components of the present embodiment of FIG. 1 to the chassis ground (frame) wiring in such vehicles (FIG. 11).

The presence of wiring junction 86 located between the fuse box and front brake light switch 82, and rear brake light switch 84 in such vehicles provides a constant supply of voltage through wire 64 to the power terminal of fog mode switch 60 (FIG. 11).

FIG. 11 show wire 66 and wire 68 of cable 50 connected to the existing wiring of the tail and brake light 78 in such vehicles so that current can flow to LEDs 36.

ADVANTAGES

From the description above, a number of advantages of some embodiments of our safety brake light assembly become evident:

(a) The use of LED housing having cable extending outside of the jacket without the discomfort of inner encircling cable going through garment, will obviate the need for custom made jacket or vest, and will permit the manufacturer to produce a cheaper traffic signaling device system.

(b) The presence of coil cable assembly extending outside of jacket in front thereof to the control box panel, which is mounted near the motorcycle controls, allows the rider to remotely view the operation of control box panel in a convenient seated position.

(c) The presence of control box panel will permit the display of LEDs, and the multifunction use of illuminated rocker switch assembly for rear visibility during normal to hazardous weather conditions.

(d) The use of coil cable can provide flexibility in any direction without requiring the introduction of coil springs for a tug effect.

(e) With the use of quick-disconnect plug to connect cable to LED housing jack, one can replace cable easily and conveniently, thus avoiding the need to splice or electrically connect the cable at the manufacturing plant.

(f) The presence of LED light array assembly having built-in turn signals and high and low intensity lighting can provide more rear visibility while on the road, turning, and slowing down or stopping without requiring separate signaling devices on jacket.

(g) The presence of fog mode switch will permit increase rear visibility in fog areas or during hazardous weather conditions.

(h) The leather piece will provide a more stylish, durable, and superior surface for attaching the safety brake light assembly to jacket, either by snap buttons or conventional hook and loop material.

(i) Although the safety brake light assembly attaches to the back side of the upper portion of the motorcycle jacket or vest, preferred place, one can attach it to a reflective vest, a back pack, a passenger's jacket, or a passenger back rest in such vehicles.

CONCLUSION, RAMIFICATIONS, AND SCOPE

Thus the reader will see that the safety brake light assembly of the various embodiments provides a more reliable, lightweight, yet economical traffic signaling device for a motorcyclist's jacket or vest, can be removed just as easily and used on any garment or gear without permanent alteration to fabric. In addition, when a rider wants to use jacket for casual wear or in a mall, one can remove the safety brake light assembly easily and replace with a logo or patch without impairing the looks of the jacket. Furthermore, the safety brake light assembly has the additional advantages in that it permits the production of LED housing and light array assembly in a variety of different colors and styles without the need for replacing the entire assembly.

it permits the installation of a flashing relay for the flashing of LEDs when slowing down or stopping without pumping the brakes for increase visibility.

it permits the electrical connection to jack of control box panel to be modular.

it allows for one to quickly release or connect coil cable to control box panel or LED housing, and easily replace cable if damaged without requiring the user to splice or electrically connect wires.

it provides an outboard support member with a superior surface upon which one can install a reflector for additional visibility.

it provides an inexpensive flexible mount for control box panel assembly which will not scratch the paint, and absorb vibrations that are produced in such vehicles without requiring the manufacturer to produce a separate mounting bracket or device.

it provides a traffic signaling device system for users of non-enclosed vehicles such as electric power wheelchairs, motor-scooters, light electric vehicles (LEVs), bicycles, etc.

While my above description contains many specificities, these should not be construed as limitations on the scope of the invention, but rather as an exemplification of one [or several] preferred embodiment thereof. Many other variations are possible. For example, the snap buttons on the leather piece can be replaced with indicator lights for additional turn signals and brake lights, etc; the support members and reflector can have other shapes, such as circular, oval, trapezoidal, triangular, etc.; the retainer can be replaced with a nut, and the groove with a screw thread which connects two otherwise unconnected members to leather piece; the quick-disconnect plugs can be made in a different shape; the plug and female jack to LED housing can be eliminated, and the coil cable can be spliced or electrically connected to the LED light array assembly; the control box panel can be replaced with a modular jack that is spliced or electrically connected to the existing wiring for the signaling device system in such vehicles; the coil cable can be replaced during the day with a wireless signaling device for transmitting signal to a receiver in the LED housing with its own solar power, and energize the plurality of LEDs when the brakes are actuated, etc.

Accordingly, the scope of the invention should be determined not by the embodiment(s) illustrated, but by the appended claims and their legal equivalents.

We claim:

1. An article of traffic signaling device system, comprising:
   (a) a safety brake and running light assembly to accommodate use by a motorcycle rider or user of non-enclosed vehicles on a jacket or other similar garment that will be more conspicuous to other drivers on the road,
   (b) means for fastening said safety brake and running light assembly to the back side of said jacket to allow removal of said safety brake and running light assembly thereof, easily and conveniently,
   (c) a control box panel which said rider manually manipulates to change the intensity of the said safety brake and running light assembly from normal lighting to high intensity lighting and is electrically connected to the existing wiring for the signaling device system of said motorcycle or said non-enclosed vehicles, said control box panel comprises an illuminated rocker switch assembly and an LED indicator light, wherein said illuminated rocker switch assembly comprises a normal mode for supplying normal intensity voltage to said safety brake and running light assembly and a high intensity mode for supplying high intensity voltage to said safety brake and running light assembly to achieve high intensity lighting during low-visibility ambient condition,
   (d) connection means for providing a continuous power supply from said control box panel to said safety brake and running light assembly without having to electrically splice said connection means thereof,
   whereby said safety brake and running light assembly will be illuminated on said jacket when the existing wiring for the signaling device system in said motorcycle or said non-enclosed vehicle is energized thus providing high or low intensity rear lighting.

2. The article of traffic signaling device system of claim 1, wherein said high intensity mode is a fog mode and wherein said low-visibility ambient condition is foggy condition.

3. The article of traffic signaling device system of claim 1, said means for fastening comprises two halves, one half is fastened to the back side of said jacket thereof and the other half sewed on to the back side of the upper portion of said jacket.

4. The article of traffic signaling device system of claim 1 wherein said means for fastening is a conventional hook and loop material or a plurality of snap buttons.

5. The article of traffic signaling device system of claim 1, wherein said safety brake and running light assembly comprises:
   (a) a plurality of light emitting diodes (LEDs),
   (b) a housing of rigid or flexible material of sufficient size that is joined to a leather piece having a predetermined cross sectional shape by a plurality of support members of substantially equal length and wherein one side of said leather piece has said means for fastening.

6. The article of traffic signaling device system of claim 5 wherein said housing includes a six-pronged female jack.

7. The article of traffic signaling device system of claim 6 wherein said six-pronged female jack includes a groove formed on both side thereof running parallel to said housing and wherein said groove is joined by a retainer.

8. The article of traffic signaling device system of claim 1, wherein said safety brake and running light assembly comprises a housing for enclosing an LED light array assembly, said LED light array assembly further comprising a plurality of brake signal LEDs, a plurality of left turn signal LEDs, and a plurality of right turn signal LEDs extending to at least the full length of said LED housing;
   wherein said LED housing is made of transparent or translucent plastic, partially tinted red for said plurality of brake signal LEDs, and partially tinted amber for the plurality of left turn and right turn signal LEDs, respectively.

9. The article of traffic signaling device system of claim 1 wherein said control box panel comprises an electrical circuit platform having a six-pronged female jack and wherein said electrical circuit platform comprises a six-conductor cable electrically connected thereof to the existing wiring of a brake light, a left turn signal light and a right turn signal light of said motorcycle or said non-enclosed vehicles.

10. The article of traffic signaling device system of claim 1 wherein said connection means is a six-conductor coil cable assembly and wherein said six-conductor coil cable assembly comprises a plurality of quick-disconnect plugs, whereby said six-conductor coil cable assembly is connected to said six-pronged female jack and said six-pronged female jack of said electrical circuit platform by said plurality of quick-disconnect plugs, easily and conveniently, without having to electrically splice thereof.

11. An article of traffic signaling device system, comprising:
   (a) an LED housing of rigid or flexible material of sufficient size to accommodate use by a motorcycle rider or user of non-enclosed vehicles on a jacket or other similar garment without requiring permanent alteration to said jacket,
   (b) an LED light array assembly housed in said LED housing,
   (c) a jack which is electrically connected to the existing wiring for a signaling device system of said motorcycle or non-enclosed vehicle,
   (d) a control box panel which said rider manually manipulates to change the intensity of the said LED light array assembly from normal to high intensity lighting and is electrically connected to the existing wiring for the signaling device system in said motorcycle or non-enclosed vehicles, said control panel box comprises an illuminated rocker switch assembly and an LED indicator light, wherein said illuminated rocker switch assembly comprises a normal mode for supplying normal intensity voltage to said LED light array assembly and a fog mode for supplying high intensity voltage to said LED light array assembly to achieve high intensity lighting during low visibility ambient condition, (e) connection means comprising a cable having a plurality of conventional insulated electrical wire leads encased for providing a continuous power supply from said jack to said LED housing without having to electrically splice said connection means thereof, and (f) a plurality of support members of substantially equal length, whereby said plurality of support members provides support for joining said LED housing to said jacket so that said LED light array assembly will be illuminated within said LED housing when the existing wiring for the signaling device system of said motorcycle or non-enclosed vehicle is energized thus providing high and low intensity rear lighting for the rider on the road.

12. The article of traffic signaling device system of claim 11, wherein said LED housing is mounted to the back side of said jacket, whereby said LED housing is essentially at eye level to other drivers on the road.

13. The article of traffic signaling device system of claim 11, wherein said LED light array assembly comprises a plurality of brake signal LEDs, a plurality of left turn signal LEDs, and a plurality of right turn signal LEDs extending to at least the full length of said LED housing and
wherein said LED housing is made of transparent or translucent plastic, partially tinted red for said plurality of brake signal LEDs, and partially tinted amber for the plurality of left turn and right turn signal LEDs, respectively.

14. The article of traffic signaling device system of claim 13 wherein said LED housing has a jack having a plurality of conventional terminals or contacts.

15. The article of traffic signaling device system of claim 14 wherein said jack has a groove formed on both side thereof running parallel to said LED housing.

16. The article of traffic signaling device system of claim 11 wherein said jack is modular and has a plurality of conventional terminals or contacts.

17. The article of traffic signaling device system of claim 11 wherein said cable is coiled and said connection means further comprises a plurality of quick-disconnect plugs used for interlocking the cable to said LED housing and said jack,
whereby said plurality of quick-disconnect plugs connect to said LED housing and said jacket, easily and conveniently, without having to electrically splice thereof.

18. A method of signaling traffic, comprising:
(a) providing an LED housing of the type comprising a rigid or flexible body of material which is able to house an LED light array assembly to accommodate use by a motorcycle rider or user of non-enclosed vehicles on a jacket or other similar garment without requiring permanent alteration to said jacket,
(b) providing a fastening means which the rider can attach said LED housing to the back side of said jacket so as to allow removal said LED housing thereof, easily and conveniently,
(c) providing a control box panel which said rider manually manipulates to change the intensity of said LED light array assembly from normal intensity lighting to high intensity lighting, said control panel is electrically connected to the existing wiring for the signaling device system in said motorcycle or non-enclosed vehicles, said control panel box comprises an illuminated rocker switch assembly and an LED indicator light, wherein said illuminated rocker switch assembly comprises a normal mode for supplying normal intensity voltage to said safety brake and running light assembly and a high intensity mode for supplying high intensity voltage to said LED light array assembly to achieve high intensity lighting during low visibility ambient condition,
(d) providing a connection means which will:
(1) allow a continuous power supply to flow from said control box panel to said LED housing without having to electrically splice said connection means thereof, and
(2) causing said connection means to flex in any direction without requiring the introduction of springs for a tug effect,
whereby said LED light array assembly will be illuminated within said LED housing when the existing wiring for the signaling device system in said motorcycle or non-enclosed vehicles is energized thus providing high or low intensity lighting on the back of the rider.

19. The method of claim 18 wherein said control box panel is preferably chrome plated.

20. The method of claim 18 wherein said LED housing is preferably tinted or colored.

* * * * *

UNITED STATES PATENT AND TRADEMARK OFFICE
CERTIFICATE OF CORRECTION

PATENT NO.       : 8,009,031 B2                                  Page 1 of 1
APPLICATION NO.  : 12/290182
DATED            : August 30, 2011
INVENTOR(S)      : Victor Manuel Pacheco et al.

It is certified that error appears in the above-identified patent and that said Letters Patent is hereby corrected as shown below:

In drawing sheet 6 of 6, change the electrical symbol for diode 65 to appear in this direction

-- --.

In col. 9, line 25, delete "cathode bar, non-pointing end, to wire 66 of cable 50" and insert therein --anode, arrowhead, to wire 66 of cable 50, in a foward bias position (forward)--; line 26, delete "opposite side of non-pointing" and insert therein --cathode bar--.

Signed and Sealed this
Nineteenth Day of June, 2012

David J. Kappos
*Director of the United States Patent and Trademark Office*